United States Patent [19]
Gokhale

[11] Patent Number: 5,815,506
[45] Date of Patent: Sep. 29, 1998

[54] METHOD FOR PROVIDING AN OVERLAY SHORT MESSAGING SERVICE IN A MOBILE SATELLITE COMMUNICATION SYSTEM

[75] Inventor: Dilip Gokhale, Gaithersburg, Md.

[73] Assignee: Comsat Corporation, Bethesda, Md.

[21] Appl. No.: 668,822

[22] Filed: Jun. 24, 1996

[51] Int. Cl.⁶ .................................................... H04J 3/12
[52] U.S. Cl. .......................................... 370/524; 370/528
[58] Field of Search ................................. 370/311, 496, 370/522, 524, 528

[56] References Cited

U.S. PATENT DOCUMENTS

| | | | |
|---|---|---|---|
| 4,018,993 | 4/1977 | Edstrom | 179/15 |
| 4,434,486 | 2/1984 | Barner, Jr. et al. | 370/110.1 |
| 5,235,598 | 8/1993 | Sasuta | 370/110.1 |
| 5,239,678 | 8/1993 | Grube et al. | 455/34.1 |

*Primary Examiner*—Min Jung
*Attorney, Agent, or Firm*—Sughrue, Mion, Zinn, Macpeak & Seas, PLLC

[57] ABSTRACT

In a mobile satellite communication system including a land-earth station which communicates with a mobile earth station via a satellite, a method is employed for providing an overlay short messaging service. According to the method, a short messaging service is selected. In addition, a short message is transmitted from one of the land earth station and the mobile earth station via the satellite to the other. The short message is transmitted in one of a plurality of out-of-band signalling channels. The transmission occurs at a time when no signalling information is being transmitted.

20 Claims, 7 Drawing Sheets

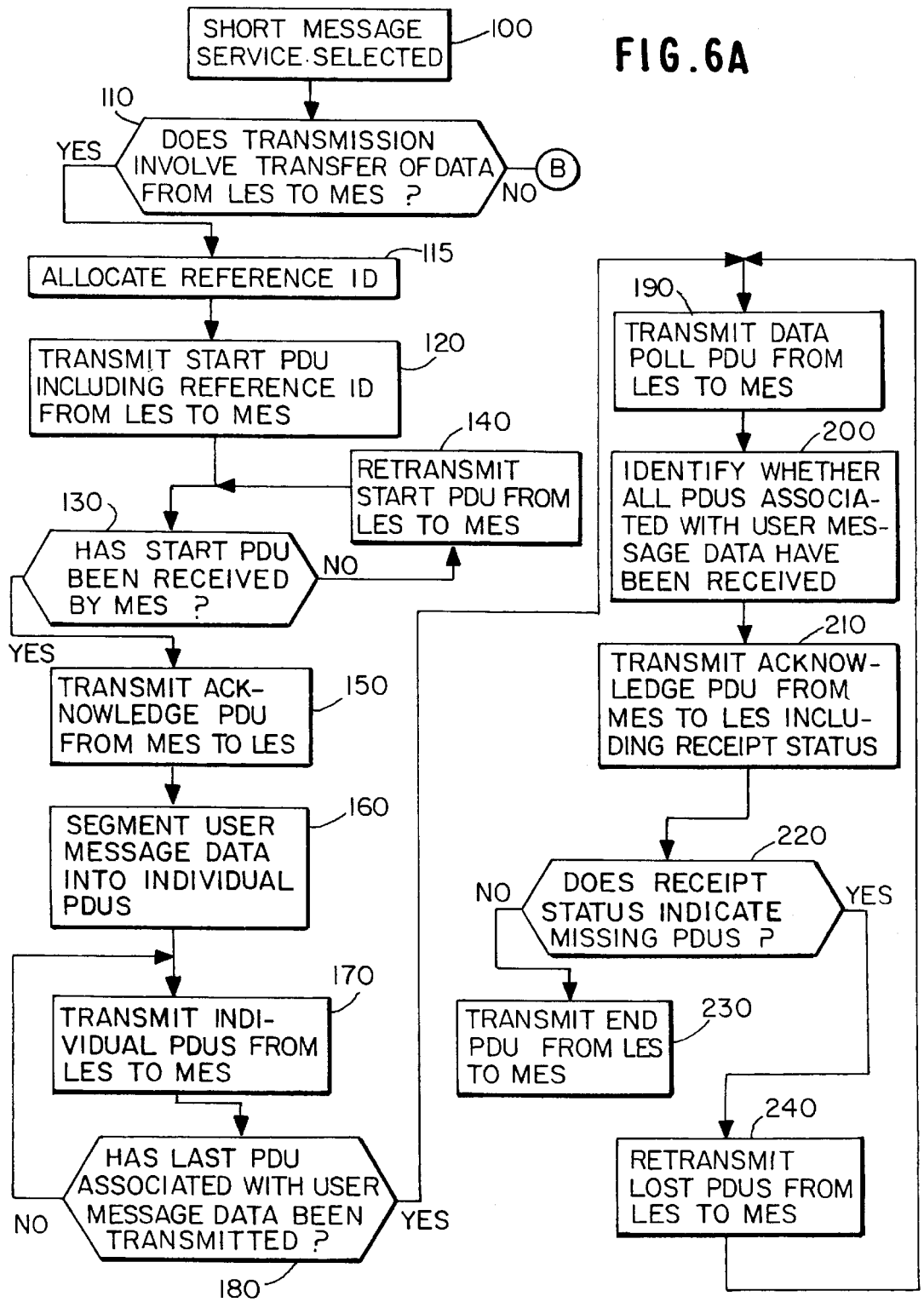

METHOD FOR PROVIDING AN OVERLAY SHORT MESSAGING SERVICE IN A MOBILE SATELLITE COMMUNICATION SYSTEM

FIELD OF THE INVENTION

The present invention relates to a method for providing an overlay short messaging service (SMS) in a mobile satellite communication system. Specifically, the present invention is directed to a method for providing an overlay short messaging service in a mobile satellite communication system which uses spare, unused capacity of the out-of-band signalling channels of the system. By using the unused capacity of the signalling channels to carry short messages, a messaging service is provided that is significantly more efficient than that of a conventional mobile satellite communication system.

BACKGROUND OF THE INVENTION

Mobile satellite communication systems, such as the Inmarsat-M, B, mini-M, and the AMSC/TMI mobile telephony system, provide for communication services to users equipped with small low profile terminals via geosynchronous satellites. In addition to a baseline telephony service, these systems also support data and facsimile services to mobile users.

In a mobile satellite system, data services can be provided in a conventional circuit mode in which an end to end full duplex circuit is established between the mobile user and the fixed user. In the conventional circuit mode, a pair of frequencies are allocated within the satellite network to transport data between the fixed and mobile earth stations. When operating in the conventional circuit mode, the mobile satellite communication system operates at a full duplex symmetric data rate to ensure compatibility with terrestrial voice band modem standards.

There are, however, a number of disadvantages with the conventional circuit mode of data transfer. These disadvantages include the inefficient utilization of resources due to the large circuit setup time, and the allocation of a full duplex circuit.

The large call setup delay within the satellite network is associated with the allocation of circuits by a network control center, the satellite modem synchronization time, the exchange of scrambling vectors, power control interactions, and optional authentication sequences. There is also a delay associated with the terrestrial link to the fixed end user which consists of the time for allocation of an end to end circuit, and the long synchronization time associated with voice band modems.

The disadvantages associated with circuit mode based data services are of less concern for applications in which a large amount of data is being simultaneously transferred to and from the mobile earth station. When a large amount of data is being transferred, the call holding time is significantly greater than the call setup time.

However, the disadvantages associated with circuit mode based data services are significant for a large number of other data applications in which only a small amount of data is transferred, or data applications in which the transfer of data is predominantly in one direction (i.e., fixed end user to mobile end user or mobile end user to fixed end user). For applications in which only a relatively small amount of data is being transferred, the use of the conventional circuit mode results in an inefficient allocation of a mobile satellite system's communication channels. This is especially true for applications which require the transfer of short messages. These short messages include voice-mail notifications, reliable paging, or industry specific applications such as Supervisory Control and Data Access (SCADA).

A conventional mobile satellite communications system is shown in FIG. 1. The ground segment of a typical mobile satellite communication system consists of a centralized Network Coordination System (NCS) 10 and a Land Earth Station (LES) 20. The NCS 10 provides for the management of satellite resources, while the LES 20 provides an interconnection to a fixed end user 95 via the terrestrial circuit and packet switched networks which are included in the ground link 98 shown in FIG. 1. The NCS 10 is also referred to as a network control center (NCC) in some systems, while the LES 20 is also referred to as a Feederlink Earth Station (FES).

The NCS 10 is responsible for transferring signalling data between the LES 20 and a Mobile Earth Station 30 (MES) to facilitate call setups and other non-call associated functions via out-of-band signalling channels. The MES 30 is also referred to as a Mobile Terminal (MT) and provides a connection between the mobile satellite communication system and a mobile end user 35. The transmission of signalling data from the NCS 10 to the MES 30 is accomplished via a geostationary satellite 40. There may be more than one NCS 10, LES 20, and MES 30 employed in a mobile satellite communication system. In addition, in some single, stand alone LES 20 systems, the NCS 10 function may be incorporated into the LES 20.

The NCS 10 transmits signalling data to the MES 30 in an out-of-band signalling channel that operates in a Time Division Multiplex (TDM) mode. The basic unit of transmission on this channel is a fixed size signalling unit (SU) which, in the case of the Inmarsat M/B systems, is 12 octets.

The MES 30 transfers signalling data to the NCS 10 in one of two inbound channels. The two signalling channels include an MES Request Channel (MESRQ) which is operated in a contention mode (slotted aloha) and a MES Response Channel (MESRP) which is operated in a reservation mode (Time Division Multiple Access).

The NCS 10 equipment and the LES 20 equipment communicate with each other via interstation links ISLs which include an interstation link for the NCS 10 (e.g. NCSI) and an interstation link for the LES 20 (e.g. LESI).

Currently, when no signaling information is being transmitted, filler SUs are sent in the forward direction to the MES while nothing is transmitted in the return direction resulting in unused capacity.

SUMMARY OF THE INVENTION

In view of the foregoing, it is an object of the present invention to enable fixed and mobile end users to transfer short messages over signalling channels in an efficient manner.

In accordance with a first embodiment of the invention, a method for providing an overlay short messaging service in a mobile satellite communication system is provided. The mobile satellite communication system includes a land earth station, a mobile earth station and a satellite.

The method includes the steps of selecting a short messaging service and transmitting a short message from one of the land earth station or the mobile earth station via the satellite to the other one of the land earth station or the mobile earth station. During the step of transmitting, the short message is transmitted in one of a plurality of out-of-band signalling channels at a time when no signalling information is being transmitted.

The step of transmitting a short message may further include the step of retransmitting portions of the short message which were not successfully received by either the land earth station or the mobile earth station.

A portion of the short message may also include a reference identifier which identifies other portions of the short message which are subsequently transmitted by the mobile earth station.

BRIEF DESCRIPTION OF THE DRAWINGS

These and other features, aspects and advantages of the present invention will become better understood with reference to the following description, appended claims, and accompanying drawings, in which:

FIGS. 6A and 6B show a flow chart incorporating a method of the present invention that can be implemented in software.

DETAILED DESCRIPTION OF THE PRESENT INVENTION

The present invention provides for the efficient transfer of messages in a mobile satellite communication system between mobile users connected to an MES and fixed users connected to an FES via one or more intermediate terrestrial networks. According to the present invention, spare, unused capacity of the baseline signalling channels of the mobile satellite communication system is employed in order to transfer user messages.

The method of the present invention, however, works within the constraints of the multiple access schemes that are associated with the signalling channels, such as the outbound Time Division Multiplex (TDM) signalling channel and the inbound Time Division Multiple Access (TDMA) and Slotted Aloha signalling channels. Additional channels of the same type can be configured in the event the demand for the service exceeds the available capacity on the baseline channels.

Advantageously, the method enables the messaging service to be supported without any hardware upgrades to either the MES, or the ground segment equipment. The short messaging service is implemented by enhancing computer software which is provided in the existing MES, LES, and NCS equipment.

The method also includes steps for optimally employing the fixed size SUs which are used for transporting the short messages, and for providing efficient recovery from SU losses which occur in the environment of the mobile satellite communication system.

The short messaging service of the present invention can be used for a wide variety of end user applications including electronic mail, reliable paging, voice/fax mail notification, and position reporting. The present invention can be implemented in a variety of mobile satellite based telephony systems including Inmarsat-M, Inmarsat mini-M, Inmarsat B and the AMSC/TMI Mobile Telephony System.

Figure 1:
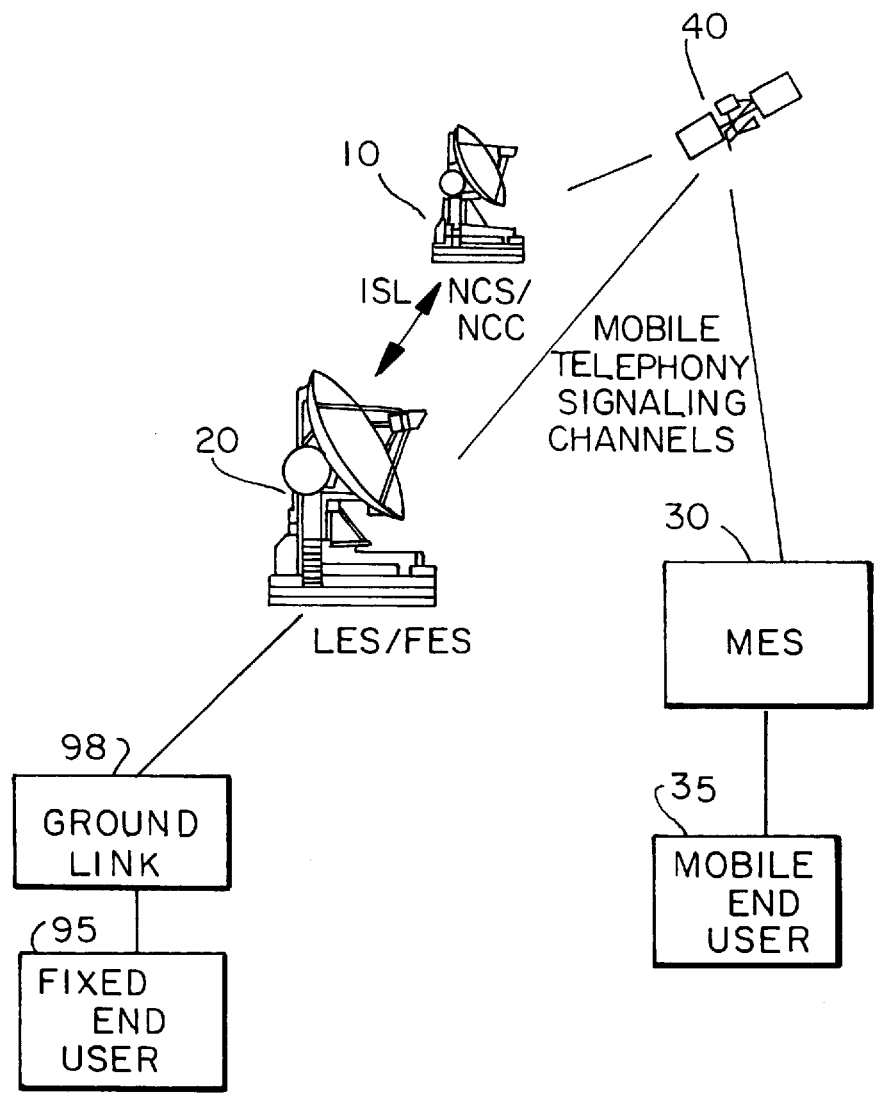
FIG. 1 shows a conventional mobile satellite communication system including a ground link, a land earth station, a mobile earth station, and a geostationary satellite.
Figure 2:
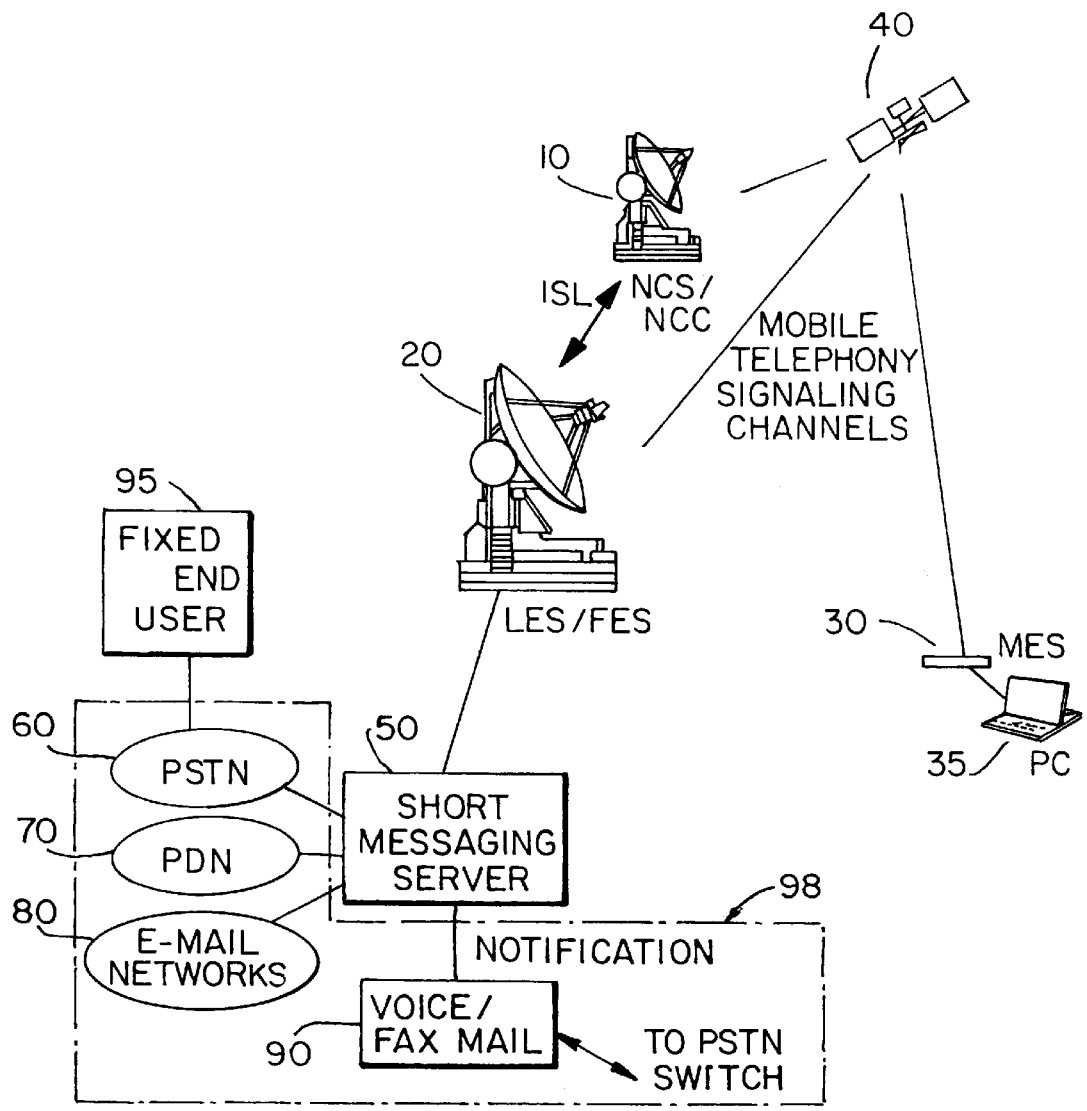
FIG. 2 shows a mobile satellite communication system in which a method of the present invention is employed.

An operational overview of the mobile communication satellite system in which the SMS of the present invention is implemented is shown in FIG. 2. The system employs a ground link 98, NCS 10, LES 20, MES 30, and geostationary satellite 40 similar to the ones depicted in FIG. 1. The ground link 98, NCS 10, LES 20, MES 30, and geostationary satellite 40 all bear the same numerical identifier used in FIG. 1.

The SMS utilizes the previously discussed mobile telephony out-of-band signalling channels to reliably deliver short messages (max. size—nominally 16 Kbytes) between fixed and mobile users.

A short messaging server 50 is responsible for implementing the SMS protocols at the LES and interfacing with the fixed users via the ground link 98. The short messaging server 50 may be implemented as a microcomputer.

In FIG. 2 a more detailed version of the ground link 98 is shown including examples of terrestrial based interfaces to a fixed user 95. These terrestrial based interfaces include a public switched telephone network PSTN 60 (dial up modem, DTMF tone recognition), a public data network PDN 70, and E-Mail networks 80. Terrestrial based interfaces may also be included which support voice and fax mail notification 90. By way of example, the fixed user 95 is connected to the short messaging server 50 through the PSTN 60.

The MES 30 also implements the SMS protocols via a microprocessor or microcomputer and interfaces to mobile end user equipment. By way of example, FIG. 2 shows the mobile end user 35 interfacing with the MES via an RS232 serial port of a portable PC.

It is also expected that mobile terminal manufacturers will provide for other interfaces such as a Smart Card for the transfer/storage of short messages. Protocols or interfaces specified by the paging industry can also be implemented within the MES in order to simplify access to the short message service for most off-the-shelf applications.

Figure 3:
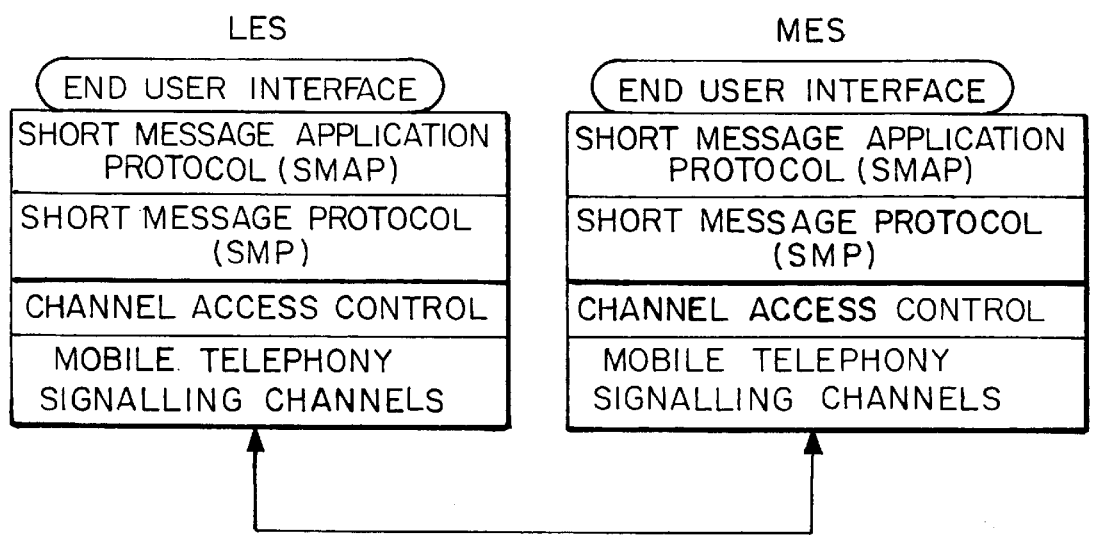
FIG. 3 shows the protocol architecture for a short messaging service that supports a method of the present invention.

The protocol architecture shown in FIG. 3 is utilized for providing the SMS. The mobile satellite communication system's signalling channels are used to transport short messaging data in the form of fixed SUs between the LES 20 and the MES 30. The Channel Access Control (CAC) protocol layer is responsible for the additional signalling functions that need to be implemented for the SMS.

The Short Message Protocol (SMP) layer is responsible for the reliable end to end delivery of short messages. The protocol supports the transfer of both fixed end user to mobile end user and mobile end user to fixed end user short messages. The maximum packet size that can be sent via SMP is dependent upon the fixed SU size and the associated header overheads. For example, with a 12 octet size SU, using the proposed scheme results in a maximum message size of 186 octets.

The Short Message Application Protocol (SMAP) is also responsible for the multiplexing of the SMP service to multiple applications, and it also provides for the delivery of messages to user specified destinations, such as an internet address. The SMAP also provides further segmentation and reassembly of messages in order to enable the transmission of messages that are longer than the maximum length supported by the Short Message Protocol.

Figure 4:
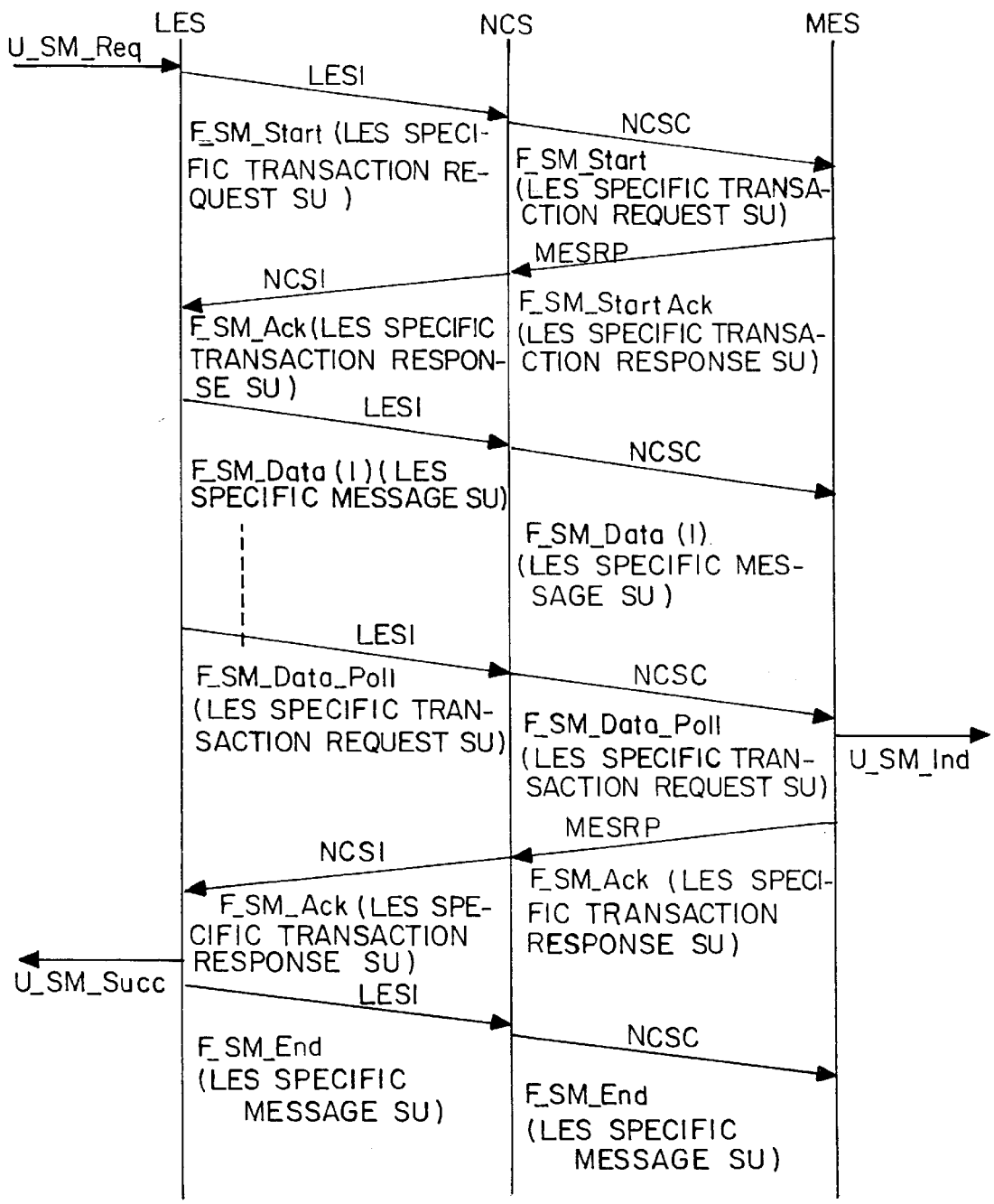
FIG. 4 shows a time sequence diagram depicting the flow of data during a fixed to mobile short message transfer according to a method of the present invention.
Figure 5:
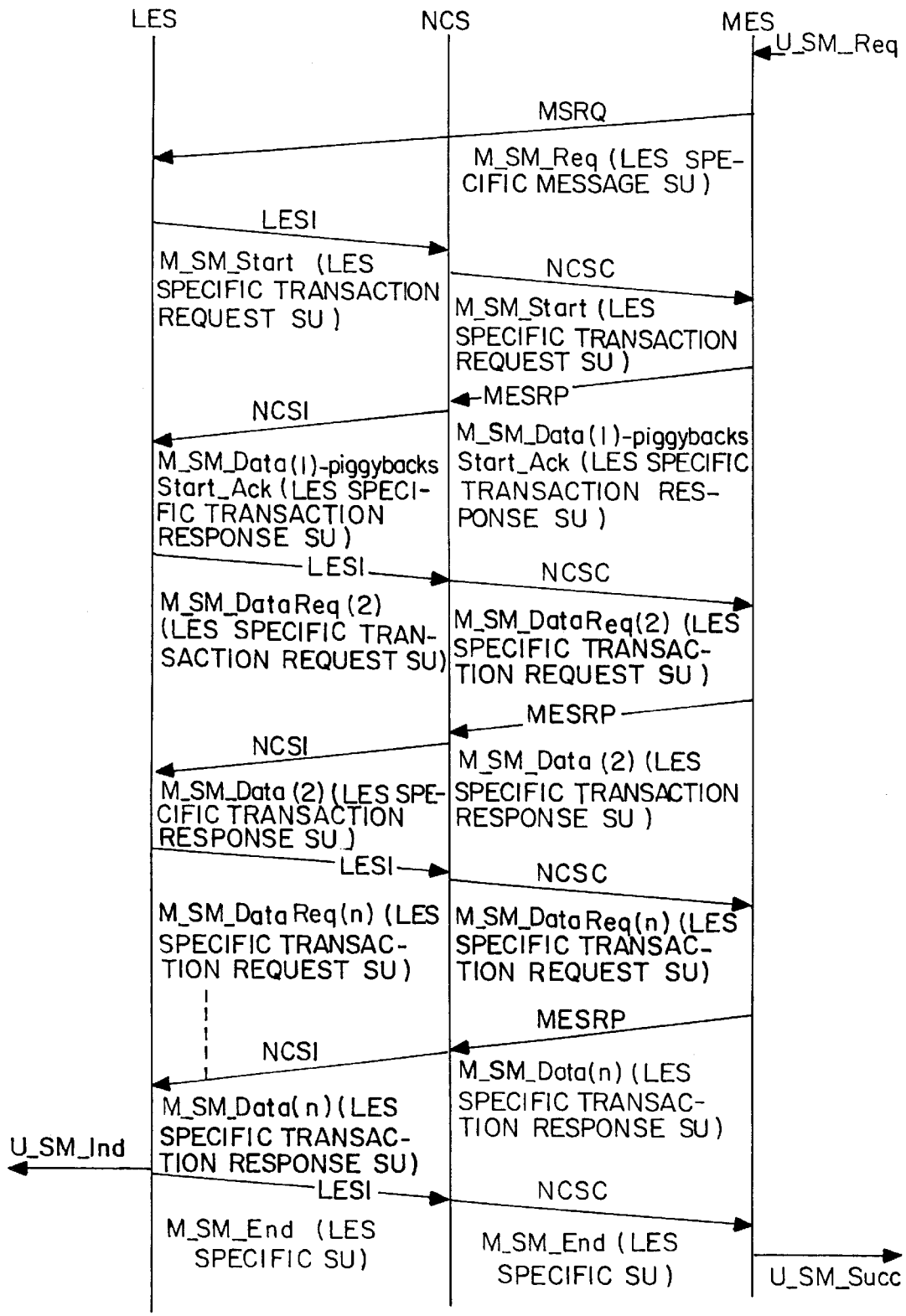
FIG. 5 shows a time sequence diagram depicting the flow of data during a mobile to fixed short message transfer according to a method of the present invention.

FIGS. 4 and 5 depict time sequence diagrams for a fixed user originated short message transfer and for a mobile user originated short message transfer, respectively. The diagrams illustrate the usage of the signalling channels and the SMP protocol data units (PDUs).

The SMS uses the baseline or out-of-band signalling channels and their corresponding access schemes for accomplishing data transfers. The signalling channels which are used to transfer the short message may, for example, correspond with the Inmarsat-B/M/mini-M system. Additional functions are defined at the CAC layer to support the transfer of SMS primitives. These additional functions include an LES specific transaction, and LES specific SU. These additional signalling functions are designed so that the SMS can be offered independent of any specific LES architecture. The additional signalling functions also enable the NCS to facilitate the service without being aware of short message protocol specifics.

An LES specific transaction enables LES originated transactions to be completed over the NCS common channel (NCSC) and the MES response channel (MESRP). An LES transaction is defined by a Request-SU that is sent from the LES to MES via the NCS (which transmits it over the NCSC), and an a priori scheduled Response-SU that is received via the MESRP channel.

An LES specific message transmission provides for the transmission of an LES specific SU over the NCSC via the NCS or over the MES Request (MESRQ) Channel. In the event that the baseline signalling channels are overloaded, additional channels of the NCSC, MESRQ, and MESRP channel type can be specifically set aside for the SMS service.

As illustrated in FIG. 4, a fixed to mobile short message transfer is initiated with a F_SM_Start PDU from the LES. The F_SM_Start PDU is transmitted as an LES specific transaction with the MES being explicitly identified. The MES on receipt of this PDU responds with an F_SM_Start_Ack PDU via the LES specific transaction response SU on the TDMA slot preassigned by the NCS. The F_SM_Start PDU contains a reference identifier that is used for identification of subsequent PDUs which are transmitted by the MES.

The reference identifier provides a significant increase in the packing of useful data in fixed SUs which are transmitted over the signalling channels. As noted previously, the mobile satellite communication system uses a fixed size signalling unit (SU) to transport data. While the fixed size SU format is adequate for basic call setup related signalling it is quite inefficient for the transport of messaging data and associated acknowledgments.

In its normal form each fixed SU typically includes a one (1) octet message type field, a three (3) octet mobile terminal identifier field, and a two (2) octet cyclic redundancy check field resulting in an overhead of six (6) octets per SU. A single octet header field is also used for the short messaging protocol, while another octet identifier field is used to identify the LES. Therefore, a total of eight (8) octets are employed strictly for overhead.

This overhead results in a significant reduction in the size of user data that can be transported in every SU. For example, with a 12 octet SU, only 4 octets of user data can be sent resulting in a packing efficiency of only 33.33%.

According to the present invention, however, a single octet reference identifier (id) replaces the three octet mobile terminal identifier so that the packing efficiency can be significantly increased. For example, with a 12 octet SU, the packing efficiency of the fixed SU increases to 50% with 6 octets being allocated for carrying user data.

The reference id accounts for only those fixed SUs which can be accommodated by the mobile satellite communication system at one time. By effectively assigning an MES a reference id based on the system's SU handling ability rather than relying on the three (3) octet mobile terminal identifier, fewer MESs must be kept track of at one time because only so many MESs can interact with the system at one time. Therefore, the reference id scheme employed by the present invention reduces the overhead associated with tracking each MES.

The user message that is transmitted by the LES is first segmented into F_SM_Data PDUs that are sent as LES specific SUs over the NCSC channel. The last data segment is sent as a F_SM_Data_Poll PDU which is transmitted as an LES specific transaction. The MES on receipt of this PDU responds with a F_SM_Ack PDU that provides a receipt status of the PDUs that have been received at the MES. In addition to providing the sequence number of the next in-sequence data PDU expected, the F_SM_Ack PDU also contains a bit mask (32 bits in the case of a 12 octet SU) that indicates the selective acknowledgment for all SUs that have been received.

The fixed SU can be even more efficiently used if the one octet LES ID field is removed in single LES systems or a smaller reference ID is allocated.

If the receipt status indicates that all data segments (i.e. PDUS) have been received, the LES concludes the message transfer by transmitting a F_SM_End PDU. However, the mobile satellite channels are susceptible to degraded bit error rates that can be caused by a variety of factors including limited link margin and multipath fading. Furthermore, the link may be susceptible to outages for terminals that encounter shadowing/blockage with respect to the satellite link. The selective error recovery scheme according to the present invention guarantees that only SUs which are lost in transmission over the signalling channel are retransmitted to ensure that the available network resources are used in an optimal manner.

In order to account for any transmission failures, the present invention provides for a reliable transfer of data in the mobile satellite environment. Thus, if the F_SM_Ack PDU indicates that all data segments have not been received successfully, the LES retransmits the lost F_SM_Data PDUs and solicits an acknowledgment status via an F_SM_Data_Poll PDU. An F_SM_End PDU is transmitted by the LES after all F_SM_Data PDUs have been successfully transmitted.

As illustrated in FIG. 5, a mobile to fixed short message transfer is initiated with an M_SM_Req PDU from the MES. This PDU is transmitted as an LES specific message over the MESRQ channel. On receipt of an M_SM_Req PDU, the LES sends an M_SM_Start PDU as an LES specific transaction to initiate the mobile to fixed short message transfer. In the event that the MES does not receive the M_SM Start PDU, the M_SM_Req PDU is retransmitted in accordance with baseline back-off parameters associated with the contention (slotted aloha) channel. The M_SM_Req PDU also indicates the size of the message being sent. The M_SM_Start PDU, as was the case with the F_SM_Start PDU, establishes the reference id that is used for the explicit addressing of subsequent PDUs.

On receipt of an M_SM_Start PDU, the MES responds with the first segment of the short message as an M_SM_

Data PDU. The LES on receipt of this PDU, transmits an M_SM_DataReq PDU (as an LES specific transaction request) to retrieve the next segment. This process is repeated until the last data segment is retrieved from the MES, at which time an M_SM_End PDU is transmitted to the MES.

An M_SM_DataReq PDU is retransmitted in the event that an M_SM_Data PDU is not received within a preset time limit. However, if the LES has not received any M_SM_DATA PDUs, then the M_SM_Start PDU is again transmitted from the LES to the MES. The above described method of transferring data from the mobile user via a transaction request/response for each segment of the SM is used to satisfy two key constraints.

The first constraint involves the access methodology associated with the baseline signalling channels which only provides the capability to reserve a single slot on the MESRP channel. Other approaches employing block reservations would require significant changes to the NCS and MES which violate the requirement to offer this service with minimal impact on the baseline system.

The second constraint involves the half-duplex operation of the signaling channels. The single request/response method is well suited to the half duplex operation over the signalling channels. The half-duplex operation is associated with certain types of mobile terminals such as the Inmarsat mini-M which have been designed to operate with a single frequency synthesizer in order to reduce equipment cost. The present invention supports such terminals by taking into account the half duplex nature of the terminals (e.g., terminal cannot transmit and receive at the same time) when they operate over the typically non-paired signalling channels.

Although FIGS. 4 and 5 do not show the SMAP PDUs, important features of a typical SMAP PDU are described below. The SMAP provides for a number of capabilities which enhance the baseline service provided by the short message protocol.

One capability is providing for the transmission of user data that is larger than the maximum size supported by the SMP. For messages which are larger than those which can be supported by the SMP, the SMAP provides for the segmentation of a large message into a number of short messages. In order to accommodate a large message, the SMAP PDU includes, for example, a field having a length of two bits so that each short message which is a component of the large message may be identified.

Other capabilities supported by the SMAP include providing for the specification of source and destination addresses of messages, and providing for the multiplexing of the SMP service to multiple applications. Included within each SMAP PDU is additional header information corresponding to addressing information and application specific information. The addressing information is provided within a variable length field of the SMAP PDU. The application information identifies the specific application with which the SMS must interface, such as an application providing e-mail. By way of example, application information can be provided within the confines of a single octet field of the SMAP PDU.

Finally, the SMAP provides for cyclic redundancy check (CRC) protection with respect to the entire message. In order to support CRC protection, a field having a fixed length of two or more octets may be provided in the SMAP PDU.

Figure 6B:
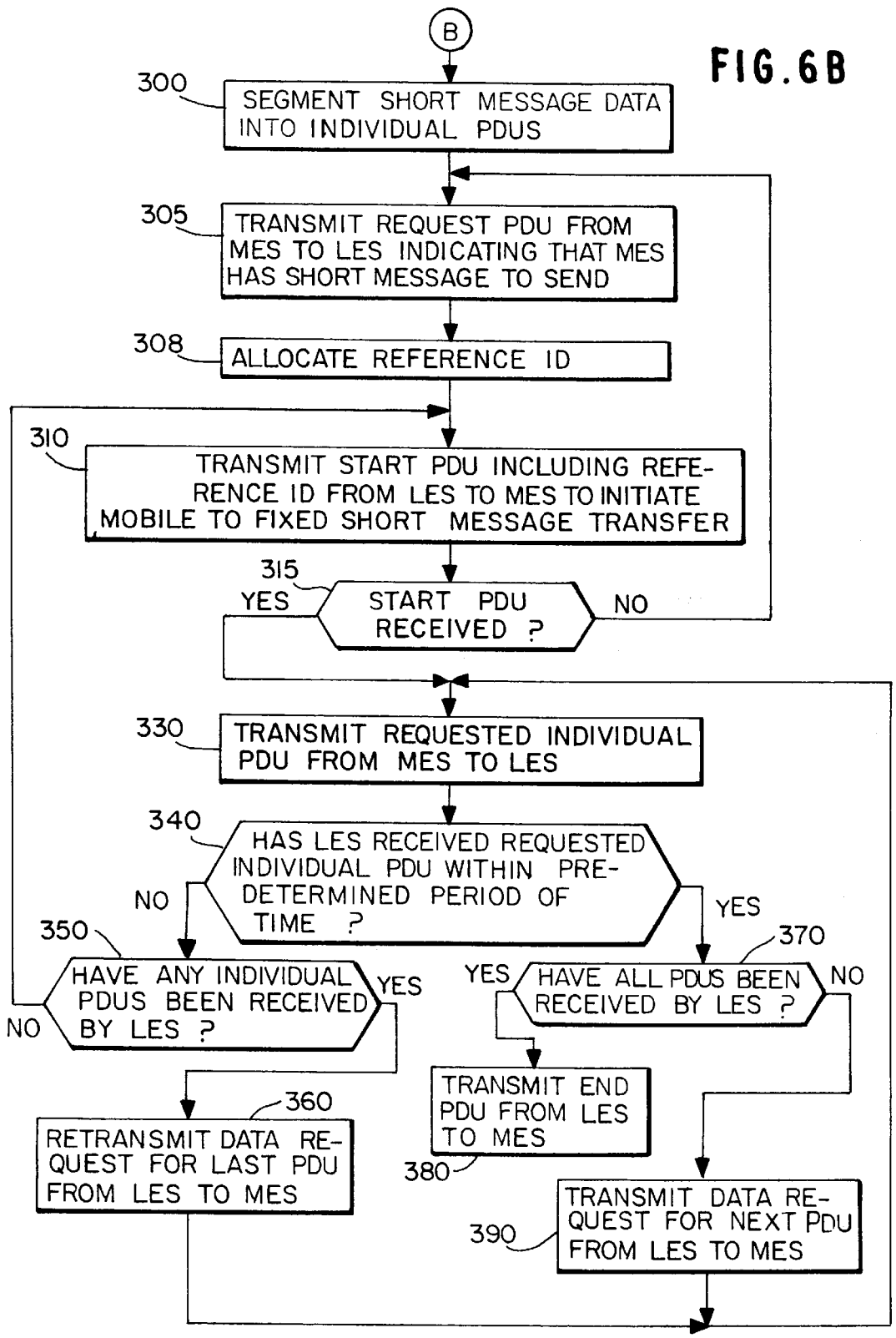

FIGS. 6A and 6B depict a flow chart for fixed to mobile, and mobile to fixed short message transfers. The flow chart can be implemented in software which is supported by the LES, NCS, and MES. However, as noted previously, the NCS controls the flow of short messages to and from the LES and the MES via a geostationary satellite. Therefore, in the discussion of FIGS. 6A and 6B which follows, it is assumed that any data transfer from the LES to the MES includes a data transfer from the LES to the NCS and from the NCS to the MES, unless the functions of the NCS are incorporated in the LES. The same is also true for data transfers from the MES to the LES. Thus, any data transfer from the MES to the LES, with the possible exception of SUs sent over the MESRQ channels, involves a transfer of data from the MES to the NCS via a geostationary satellite and from the NCS to the LES.

FIG. 6A depicts a flow chart for the Fixed to Mobile Short Message Transfer which is illustrated in FIG. 4. In step 100, a short message service is selected by a user. In step 110, it is determined whether the transmission of the short message involves a transfer of data from the LES to an MES or vice versa.

If the transmission involves a transfer of data from the LES to an MES, then in step 115 a reference identifier is allocated to efficiently identify PDUs which are subsequently transmitted from the MES to the FES. In step 120 a F_SM_START PDU is transmitted from the LES to that MES to inform the MES that it should proceed with the transmission of the short message data. The F_SM_START PDU includes the reference identifier which is allocated in step 115.

In step 130, it is determined whether the F_SM_START PDU has been received by the MES. If the F_SM_START PDU has not been received by the MES after a predetermined period of time, then the F_SM_START PDU is retransmitted along with the reference identifier in step 140. If the F_SM_START PDU is received by the MES, then in step 150 an F_SM_ACK PDU is transmitted from the LES to the MES acknowledging the receipt of the F_SM_START PDU.

In step 160, a user message is segmented into individual PDUs for transfer from the LES to the MES. Once the user generated short message has been segmented into PDUs, a series of F_SM_DATA PDUs are transmitted from the LES to the MES in step 170. In step 180, it is determined whether the last F_SM_DATA PDU associated with the user generated short message has been transmitted to the MES. If the last F_SM_DATA PDU has not been transmitted then step 170 is repeated.

However, if the last F_SM_DATA PDU is transmitted, then the LES transmits a F_SM_POLL PDU to the MES in step 190 inquiring as to whether all of the individual PDUs associated with the user message have been received.

Based on information provided in the F_SM_DATA PDU, the MES determines whether all of the PDUs associated with the user message data have been received in step 200. In step 210, the MES transmits a F_SM_ACK PDU including the receipt status of the individual PDUs transmitted by the LES to the MES. The F_SM_ACK PDU acknowledges the receipt of the F_SM_POLL PDU. In step 220, the receipt status of the individual PDUs is checked to see whether all of the PDUs were successfully transmitted by the LES.

If it is determined in step 220 that the MES did receive all of the transmitted PDUs, then in step 230 the LES transmits a F_SM_End PDU to the MES indicating that the short message has been transferred to the MES. However, if it is determined in step 220, that the MES did not receive all of the transmitted PDUs, then in step 240, the PDUs which were not transferred successfully will be retransmitted. Following step 240, step 190, in which a F_SM_POLL PDU is transmitted to the MES, is again performed.

FIG. 6B depicts another portion of the above-mentioned flow chart which relates to the Mobile to Fixed Short Message Transfer which is illustrated in FIG. 5. In step 110 shown in FIG. 6A, if the transmission of a short message does not involve the transfer of data from an LES to an MES, then step 300 is performed, as shown in FIG. 6B.

In step 300, the MES segments a short message which is to be transmitted to the FES into individual data PDUs. In step 305, a M_SM_REQ PDU is transmitted from the MES to the LES indicating that the MES has a short message to send. In step 308, a reference identifier is allocated to identify future PDUs which are transmitted from the MES to the LES. In step 310, if the LES receives the M_SM_REQ PDU, then the LES transmits a M_SM_START PDU from the LES to the MES to initiate a mobile to fixed short message transfer by requesting that the first individual data PDU be transmitted.

In step 315, it is determined whether the MES has received the M_SM_START PDU. If the MES did not receive the M_SM_START PDU, then step 305, in which an M_SM_REQ PDU is transmitted from the MES to the LES, is again performed. However, if the M_SM_START PDU has been received, then the step 330 is performed in which the MES transmits a requested individual M_SM DATA PDU to the LES.

In step 340, it is determined whether the most recently requested M_SM_DATA PDU has been received by the LES within a predetermined period of time. If the most recently requested M_SM_DATA PDU has not been received, then it is determined whether the LES has received any individual PDUs at all in step 350. If the LES has not received any individual PDUs, then step 310 is performed, in which the LES transmits a M_SM_START PDU.

However, if the LES has previously received the most recently requested individual M_SM_DATA PDU, then in step 360 an M_SM_DATAREQ PDU is again transmitted from the LES to the MES in order to request the most recently requested M_SM_DATA PDU. Following step 360, step 330 is again performed in which the MES again transmits the most recently requested M_SM_DATA PDU again which was not received by the LES.

Returning to step 340, if it is determined that the LES has received the most recently requested individual M_SM_DATA PDU from the MES, then in step 370 it is determined whether all of the individual PDUs have been received by the LES as determined by information which is provided in the initial M_SM_REQ PDU that was transmitted in step 300. If all of the individual PDUs which comprise a short message have been received, then in step 380, the LES transmits an M_SM_END PDU to the MES which indicates that all of the individual data PDUs have been successfully received by the LES.

If all of the individual data PDUs have not been received then in step 390, the LES transmits a M_SM_DATAREQ PDU to the MES to indicate that the next individual PDU should be transmitted to the LES. Following step 390, step 330 is performed in which the MES transmits the next M_SM_DATA PDU to the LES.

While the invention has been described with reference to a preferred embodiment, various modifications will be apparent to those of working skill in this technological field. Thus, the invention should be considered as limited only by the appended claims.

What is claimed is:

1. A method of providing an overlay short messaging service in a mobile satellite communication system including a land earth station which communicates with a mobile earth station via a satellite, said method comprising the steps of:

selecting a short messaging service; and transmitting a short message from one of said land earth station or said mobile earth station via said satellite to the other of said land earth station or said mobile earth station;

wherein during said step of transmitting, said short message is transmitted in one of a plurality of out-of-band signalling channels at a time when no signalling information is being transmitted; and wherein said step of transmitting a short message further comprises the step of identifying whether the transmission involves one of a transfer of said short message from said land earth station to said mobile earth station or a transfer of said short message from said mobile earth station to said land earth station.

2. The method defined in claim 1, wherein said step of transmitting a short message involves a transfer of said short message from said land earth station to said mobile earth station.

3. The method defined in claim 2, wherein, the step of transmitting a short message further comprises the steps of:

after the step of identifying, transmitting a start protocol data unit from said land earth station to said mobile earth station for informing said mobile earth station that it should proceed with the transmission of said short message;

determining whether said start protocol data unit has been received by said mobile earth station;

transmitting a first acknowledgement protocol data unit from said mobile earth station to said land earth station if it is determined that said start protocol data unit has been received by the mobile earth station;

segmenting said short message into a plurality of individual user data protocol data units;

transmitting said plurality of individual user data protocol data units from said land earth station to said mobile earth station;

determining whether a last individual user data protocol data unit of said plurality of individual user data protocol data units associated with said short message has been transmitted;

transmitting a first data poll protocol data unit from the land earth station to the mobile earth station to inquire whether all of said plurality of individual user data protocol data units associated with said short message have been received by said mobile earth station;

determining whether all of said plurality of individual user data protocol data units associated with said short message have been received by said mobile earth station based on information included in said first data poll protocol data unit;

transmitting a second acknowledge protocol data unit from said mobile earth station to said land earth station including the receipt status of said plurality of individual user data protocol data units, said receipt status identifying ones of said plurality of individual user data protocol data units that were not received by said mobile earth station;

determining whether said receipt status includes said ones of said plurality of individual user data protocol data units that were not received by said mobile earth station; and retransmitting said ones of said plurality of individual user data protocol data units that were not received by said mobile earth station.

4. The method defined in claim 3, wherein said step of transmitting a start protocol data unit is repeated if it is determined that said start protocol data unit has not been received by said mobile earth station.

5. The method defined in claim 3, wherein the step of transmitting a short message further comprises the step of terminating said short message by transmitting an end protocol data unit if it is determined that there are no ones of said plurality of individual user data protocol data units that were not received by said mobile earth station.

6. The method defined in claim 3, wherein after said step of retransmitting, said step of transmitting a short message further comprises the step of transmitting a second data poll protocol data unit following said step of retransmitting.

7. The method defined in claim 3, wherein the step of transmitting a start protocol data unit, said start protocol data unit comprises a reference identifier which identifies protocol data units which are subsequently transmitted by said mobile earth station.

8. The method defined in claim 2, wherein said step of transmitting a short message involves a transfer of said short message from a mobile earth station to a land earth station.

9. The method defined in claim 8, wherein the step of transmitting a short message further comprises the steps of:

segmenting said short message into a plurality of individual user data protocol data units if it is determined that said start protocol data unit has been received by said mobile earth station;

transmitting a request protocol data unit from said mobile earth station to said land earth station to inform said land earth station that the mobile earth station has a message to be transmitted to said land earth station;

transmitting a start protocol data unit from said land earth station to said mobile earth station for informing said mobile earth station that it should proceed with the transmission of said short message if said land earth station receives said request protocol data unit;

determining whether said start protocol data unit has been received by said mobile earth station;

transmitting one of said plurality of individual user data protocol data units from said mobile earth station to said land earth station if it has been determined that said start protocol data unit has been received by said mobile earth station;

determining whether said one of said plurality of individual user data protocol data units associated with said short message has been received by said land earth station within a predetermined period of time from the transmission of said start protocol data unit;

determining whether any of said plurality of individual user data protocol data units have been received by said land earth station if it is determined that said one of said plurality of individual user data protocol data units has not been received by said land earth station; and retransmitting said start protocol data unit if it is determined that none of said plurality of individual user data protocol data units have been received by said land earth station.

10. The method defined in claim 9, wherein the step of transmitting a short message further comprises the steps of:

transmitting a data request protocol data unit in order to have said individual user data protocol data unit retransmitted if it is determined that any of said plurality of individual user data protocol data units have been received by said land earth station; and retransmitting said one of individual user data protocol data units from said mobile earth station to said land earth station when said mobile earth station receives said data request protocol data unit after it has been determined that any of said plurality of individual user data protocol data units have been received by said land earth station.

11. The method defined in claim 9, wherein following the step of determining whether said one of said plurality of individual user data protocol data units has been received, said step of transmitting a short message further comprises the steps of:

determining whether all of said plurality of individual user data protocol data units have been received by said land earth station;

transmitting said data request protocol data unit for a next individual user data protocol data unit if it is determined that all of said plurality of individual user data protocol data units have not been received by said land earth station; and transmitting said next individual user data protocol data unit from said mobile earth station to said land earth station following a receipt by said mobile earth station of said data request protocol data unit.

12. The method defined in claim 11, wherein said step of transmitting a short message further comprises the step of transmitting an end protocol data unit from said land earth station to said mobile earth station, if it is determined that all of said plurality of individual user data protocol data units associated with said short message have been received by said land earth station.

13. The method defined in claim 9, wherein, in the step of transmitting a start protocol data unit, said start protocol data unit comprises a reference identifier which identifies protocol data units which are subsequently transmitted by said mobile earth station.

14. The method defined in claim 9, wherein said request protocol data unit provides an indication of the total number of individual protocol data units to be transmitted by said mobile earth station to said land earth station.

15. The method defined in claim 2, wherein said mobile satellite communication system further comprises a network coordination system for transferring said signalling information and short messages between said land earth station and said mobile earth station.

16. The method defined in claim 2, wherein said mobile satellite communication system comprises a plurality of mobile earth stations, a plurality of land earth stations, and a plurality of satellites.

17. The method defined in claim 2, wherein said satellite comprises a geostationary satellite.

18. The method defined in claim 2, wherein said mobile earth station comprises a single frequency synthesizer.

19. A method of providing an overlay short messaging service in a mobile satellite communication system including a land earth station which communicates with a mobile earth station via a satellite, said method comprising the steps of:

selecting a short messaging service; and transmitting a short message from one of said land earth station or said mobile earth station via said satellite to the other of said land earth station or said mobile earth station;

wherein during said step of transmitting, said short message is transmitted in one of a plurality of out-of-band signalling channels at a time when no signalling information is being transmitted, wherein said plurality of out-of-band signalling channels include a forward channel extending from said land earth station to said mobile earth station via said satellite and at least two return channels extending from said mobile earth station to said land earth station.

20. The method defined in claim 18, wherein said forward channel comprises a Time Division Multiplex channel and said at least two return channels comprise a reservation Time Division Multiple Access channel and a Slotted Aloha Channel.

\* \* \* \* \*